US008134253B2

(12) United States Patent
Watanabe

(10) Patent No.: US 8,134,253 B2
(45) Date of Patent: Mar. 13, 2012

(54) LOAD DRIVING CIRCUIT, INTEGRATED CIRCUIT, DC-DC CONVERTER, AND LOAD DRIVING METHOD

(75) Inventor: Chihiro Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 273 days.

(21) Appl. No.: 12/448,773

(22) PCT Filed: Oct. 24, 2007

(86) PCT No.: PCT/JP2007/070733

§ 371 (c)(1),
(2), (4) Date: Jul. 7, 2009

(87) PCT Pub. No.: WO2008/102479

PCT Pub. Date: Aug. 28, 2008

(65) Prior Publication Data

US 2010/0090530 A1 Apr. 15, 2010

(30) Foreign Application Priority Data

Feb. 21, 2007 (JP) ................................ 2007-041319

(51) Int. Cl.
*H02J 3/14* (2006.01)

(52) U.S. Cl. .......... 307/37; 361/93.1; 361/93.7; 361/97; 361/98; 361/101

(58) Field of Classification Search .................... 307/37; 361/93.1, 93.7, 97, 98, 101
See application file for complete search history.

(56) References Cited

U.S. PATENT DOCUMENTS

| | | | | |
|---|---|---|---|---|
| 6,177,787 | B1 * | 1/2001 | Hobrecht | 323/283 |
| 2003/0063108 | A1 | 4/2003 | Isono et al. | |
| 2004/0001040 | A1 | 1/2004 | Kardach et al. | |
| 2006/0033482 | A1 | 2/2006 | Florence et al. | |

FOREIGN PATENT DOCUMENTS

| | | |
|---|---|---|
| CN | 1410963 | 4/2003 |
| JP | 2001-297399 | 10/2001 |
| JP | 2005-173487 | 6/2005 |
| JP | 2006-039169 | 2/2006 |
| JP | 2006-114324 | 4/2006 |
| JP | 2006-318773 | 11/2006 |
| JP | 2006318773 | * 11/2006 |

* cited by examiner

*Primary Examiner* — Rexford N Barnie
*Assistant Examiner* — Toan Vu
(74) *Attorney, Agent, or Firm* — Harness, Dickey & Pierce, PLC

(57) ABSTRACT

A load driving circuit (20) according to the present invention, for carrying out PWM control to cause currents of respective light emitting diode lines (3-1 . . . 3-N) connected in parallel, each of the light emitting diode lines (3-1 . . . 3-N) including a plurality of light emitting diodes (4) connected in series, causes timing at which a current of any one of the light emitting diode lines (3-1 . . . 3-N) is turned on or off to be different from timing at which current(s) of at least another one of the light emitting diode lines (3-1 . . . 3-N) is(are) turned on or off. This makes it possible to provide a load driving circuit which (i) does not have a reduction in a degree of freedom in selecting a frequency of a PWM control signal that is used to control loads, (ii) does not prevent a peripheral circuit from following the PWM control circuit, and (iii) prevents generation of sounds.

20 Claims, 11 Drawing Sheets

LOAD DRIVING CIRCUIT, INTEGRATED CIRCUIT, DC-DC CONVERTER, AND LOAD DRIVING METHOD

TECHNICAL FIELD

The present invention relates to a load driving circuit, an integrated circuit, a DC-DC converter, and a load driving method, each of which carries out PWM control which causes a load, such as an LED, to be turned on or off.

BACKGROUND ART

In recent years, an LED (Light Emitting Diode) has been used as a light source used in a backlight of a liquid crystal display device, in place of a CCFL (Cold Cathode Fluorescent Lamp) employing a fluorescent bulb.

Particularly, in terms of easiness in controlling balance of colors, a method of obtaining a white color by (i) using each of primary colors of a red LED, a green LED, and a blue LED, independently, and (ii) optically combining the colors in an additive manner is advantageous, and therefore a lot of research has been made in order to apply the method to a television technology.

Basically, an LED has a property of having a change in its luminance depending on a current, and a forward voltage of an LED varies depending on individual differences, and/or the temperature, for example. For this reason, in a case where an LED is used as a backlight of a liquid crystal panel (an LCD (Liquid Crystal Display), for example), it is demanded that a drive device for driving the LED has a constant current characteristic so as to obtain a constant and uniform luminance.

As a brief explanation, as illustrated in FIG. 8, such a method has been known that an LED 102 and a resistance element 103 are connected to an output of a constant-voltage power source 101 in series so as to control a current. However, in a device illustrated in FIG. 8, with a high-luminance LED 102 in which a high current flows, the resistance element 103 causes a lot of power loss.

In order to solve the problem, there has been a method of using a constant current power source 201 as a drive device, as illustrated in FIG. 9. With the drive device, it is possible to adjust a luminance of the LED 102 by lessening (reducing) a current value. In order to change the current value, the following method has been generally used. That is, (i) a resistance element 105 is inserted in series with the LED 102, (ii) a current value is detected from a potential difference between both ends of the resistance element 105, and (iii) feedback control is carried out so as to cause the current value to be a desired value.

However, lower the current becomes, lower the potential difference becomes. This reduces a degree of accuracy in detecting the current value, and tends to cause the detection to be affected by a noise or the like. Further, if a high resistance value is set for the purpose of obtaining a sufficient voltage from a low current, there is a disadvantage that, in a case of a high current, power loss becomes large.

In order to solve the problem, a drive device adopting a PWM control method has been known. In the PWM control method, in order to stably adjust the luminance in a wide dynamic range, a current of an LED is turned on or off at certain timing, and the luminance is adjusted depending on a ratio of the on state to the off state.

As one of methods for realizing the PWM control method, the following method has been adopted. That is, as illustrated in FIG. 10, a switch element 106 is inserted in series with the LED 102, and is turned on or off by use of a PWM signal (PWM control signal) at predetermined timing.

As described above, if a drive device, such as a backlight of an LCD or an electric light, adopts the PWM control method with which a light emitting element is turned on or off at predetermined timing so as to adjust the luminance based on the ratio of the on state to the off state, it becomes possible to stably adjust the luminance in a wide range.

Meanwhile, a frequency of the PWM control is usually set to be not less than 60 Hz so as to avoid a flicker.

However, magnetic members (not illustrated) (such as a transformer (not illustrated) and a choke coil (note illustrated)), a capacitor (not illustrated), and the like, each of which is used in the constant voltage power source 101, fundamentally have a property of vibrating in accordance with a frequency of an applied current and/or an applied voltage. The frequency that is not less than 60 Hz is included in a human audible range. Therefore, there is a disadvantage that a human audible noise often occurs.

On the other hand, Patent Literature 1 discloses a parameter technique of setting a frequency of a PWM signal to be not less than 20 kHz. By setting a frequency of a PWM control signal to be not less than 20 kHz, it becomes possible to cause the vibration generated by the magnetic members (such as the transformer and the choke coil), or the capacitor, to be a frequency not less than 20 kHz. Therefore, it becomes possible to prevent a human audible noise from being generated.

CITATION LIST

Patent Literature 1

Japanese Patent Application Publication, Tokukai, No. 2006-114324 A (Publication Date: Apr. 27, 2006)

SUMMARY OF INVENTION

However, the technique disclosed in said Patent Literature 1 has the following three problems.

Firstly, since there is a limitation in selecting a frequency, a degree of freedom in selecting the frequency is reduced. Secondly, because of a high frequency (not less than 20 kHz) of a PWM control signal, it is difficult for a peripheral circuit, such as a constant voltage power source, to follow the PWM control signal during a low duty period (in which the ON state period is short). Because of this, there is a risk that a load is not driven correctly. Thirdly, as will be described later with reference to FIG. 11, in a case where a plurality of series circuits (LED lines), each of which includes a plurality of LEDs connected in series, are connected in parallel, all of the LED lines are turned on or off simultaneously. This causes a sharp load fluctuation, and therefore members (output capacitor, for example) provided to the constant voltage power source generate sounds. Accordingly, this causes an additional problem that a driver circuit must be adjusted.

The first problem is as described above. The following descriptions deal with the second and third problems more specifically with reference to the diagrams.

FIG. 11 is a circuit diagram of a conventional technique, illustrating a DC-DC converter 110 (constant voltage power source) for gradually changing the brightness of a load, and a liIn other words, as shown in the timing chart of FIG. 12*ght* emitting diode section 111 including the load which is a light emitting diode 120. As illustrated in FIG. 11, an external power source 112 for driving the DC-DC converter 110 is attached to the DC-DC converter 110. In other words, the power source 112 is a power supply of the DC-DC converter 110.

The DC-DC converter 110 includes: a switching regulator IC 113; and external members of the switching regulator IC 113 (i.e. an inductor (L) 114, a schottky barrier diode (SBD) 115, a first N-CH FET 116, a smoothing capacitor (C) 117, and resistances (R) 118 and 119). It should be noted that, as illustrated in FIG. 11, an end of the first N-CH FET 116, an end of the smoothing capacitor 117, and an end of the resistance 119 are grounded independently.

The DC-DC converter 110 steps up an input voltage $V_{in}$ received from the power source 112, and then outputs a desired output voltage $V_{out}$. Specifically, an alternating current voltage generated in the inductor 114 is half-wave rectified in the schottky barrier diode 115, and then smoothed in the smoothing capacitor 117. The output voltage $V_{out}$ is thus generated.

Further, the output voltage outputted from the schottky barrier diode 115 is divided in the resistances 118 and 119, and then the divided voltage is fed back to the switching regulator IC 113. With the voltage thus fed back and the power source voltage (input voltage $V_{in}$), the switching regulator IC 113 carries out pulse control so as to cause the first N-CH FET 116 to be turned on or off.

On the other hand, the light emitting diode section 111 is such a circuit that N light emitting diode lines 121-1 . . . 121-N, each of which includes a plurality of light emitting diodes (LEDs) 120 connected in series, are connected in parallel.

An end light emitting diode 120 of each of the light emitting diode lines 121-1 . . . 121-N is connected to a second N-CH FET 122 independently. Each of the second N-CH FETs 122 is connected to a cathode side of each of the end light emitting diode 120. Further, into gates of these second N-CH FETs 122, the same PWM control signal is inputted. By controlling the second N-CH FETs 122 to be turned on or off, currents I LED 1 . . . I LED N (a total current of these currents is shown as $I_{out}$ in FIG. 11) of the respective light emitting diode lines 121-1 . . . 121-N are controlled. As a result, the luminance of each of the light emitting diodes 120 is adjusted. It should be noted that each of the second N-CH FETs 122 is arranged such that a drain is connected to a cathode of the light emitting diode 120, and a source is grounded.

The following further explains operation in a case where the luminance of the LEDs used in the light emitting diode section 111 having the arrangement described above is adjusted by duty ratio control of the PWM control signal.

As shown in a timing chart of FIG. 12, if a frequency of the PWM control signal is set to be not less than a certain value (not less than 200 Hz, for example), the luminance is caused to be uniform visually. Therefore, it is possible to adjust a tone (light-dark) of the luminance in accordance with the duty ratio (X %).

In other words, as shown in the timing chart of FIG. 12, timing at which the currents I LED 1 . . . I LED N are turned on or off is synchronized with timing at which the PWM control signal is turned on or off, so as to control the currents I LED 1 . . . I LED N to be turned on (to flow) or off (not to flow). Therefore, it becomes possible to adjust the brightness of the whole light emitting diode section 111.

If the duty ratio of the PWM control signal is set to be a certain value, a power supply switch (the second N-CH FET 122) is turned on or off depending on logic of "H" or "L". However, as shown in FIG. 13, a waveform of the output voltage $V_{out}$ shows a problematic shape at timing when the second N-CH FET 122 is switched over from the on state to the off state (time t, for example), and at timing when the second N-CH FET 122 is switched over from the off state to the on state.

That is, when the second N-CH FET 122 is switched over from the on state to the off state, the output voltage $V_{out}$ rises over a desired value by some volts (V). Further, when the second N-CH FET 122 is switched over from the off state to the on state, the output voltage $V_{out}$ drops below the desired value by some volts (V). The following explains this point more specifically.

(a) From the On State to the Off State

At the moment that the second N-CH FET 122 is turned off (that is, the PWM control signal is turned off), the load becomes less. In other words, the connection between all of the light emitting diodes 120 and the DC-DC converter 110 is disconnected, so that the output voltage $V_{out}$ rises. Further, since the connection between the light emitting diodes 120 and the DC-DC converter 110 is disconnected, the DC-DC converter 110 loses a discharge path of its output section, and the potential is retained by the smoothing capacitor 117. Furthermore, since the DC-DC converter 110 is disconnected from the light emitting diodes 120, it becomes unnecessary to supply the DC-DC converter 110 with electric power. Accordingly, the DC-DC converter 110 is caused to be substantially in a resting state.

(b) From the Off State to the On State

At the moment that the second N-CH FET 122 is turned on (that is, the moment that the PWM control signal is turned on), the load becomes large. In other words, all of the light emitting diodes 120 and the DC-DC converter 110 are connected to each other, so that the voltage of the output section of the DC-DC converter 110 decreases. At this point, for a shortage of the voltage, the DC-DC converter 110 starts to operate to increase the voltage $V_{out}$ of the output section. However, there is usually a certain time lag between a load fluctuation and a beginning of the operation, and therefore it is impossible to avoid the reduction in the voltage.

Meanwhile, as the smoothing capacitor 117 described above, a laminated ceramic capacitor is often used. However, if a voltage supplied to the laminated ceramic capacitor changes, the laminated ceramic capacitor has a mechanical vibration due to piezoelectricity of dielectrics, and therefore generates sounds.

In other words, a fluctuation in the voltage $V_{out}$ of the output section of the DC-DC converter 110, such as (a) and (b) described above, causes the smoothing capacitor 117 to generate sounds (third problem).

Further, in a case of the high frequency as described in Patent Literature 1, that is, in a case where the frequency is not less than an audible frequency range, the waveform of the output current $I_{out}$ from the DC-DC converter 110 becomes less sharp due to the time lag between the load fluctuation and the beginning of the operation (described in (b)). Because of this, it becomes impossible to carry out the linear dimmer, and therefore the DC-DC converter 110 cannot follow the PWM signal. Particularly, during the low duty period (that is, a period in which the on-state period is short), it becomes difficult for the DC-DC converter 110 to follow the load fluctuation (second problem).

The present invention is made in view of the problem. An object of the present invention is to provide a load driving circuit, an integrated circuit, a DC-DC converter, and a load driving method, each of which (i) does not have a reduction in a degree of freedom in selecting a frequency of a PWM control signal that is used to control loads, (ii) does not prevent a peripheral circuit from following the PWM control signal, and (iii) prevents generation of sounds.

In order to attain the object, a load driving circuit of the present invention includes switching circuits includes switching circuits for carrying out PWM control which causes currents of respective series circuits connected in parallel to be turned on or off, each of the series circuits including a plurality of loads connected in series, the switching circuits causing timing at which a current of any one of the series circuits is turned on or off to be different from timing at which current(s) of at least another one of the series circuits is(are) turned on or off.

Further, in order to attain the object, a load driving method of the present invention, for carrying out PWM control which causes currents of respective series circuits connected in parallel to be turned on or off, each of the series circuits including a plurality of loads connected in series, includes the step of: causing timing at which a current of any one of the series circuits is turned on or off to be different from timing at which current(s) of at least another one of the series circuits is(are) turned on or off.

The switching circuits provided to the load driving circuit of the present invention carry out PWM (Pulse Width Modulation) control which causes currents of respective series circuits to be turned on or off, in a case where a plurality of series circuits (each of which includes a plurality of loads connected in series) are connected in parallel.

With the arrangement, the switching circuits cause the timing at which a current of any one of the series circuits is turned on or off to be different from timing at which current(s) of at least another one of the series circuits is(are) turned on or off. Therefore, in a case where the PWM control causes the currents of respective series circuits to be turned on or off, at least one of the series circuit(s) is(are) caused to be turned on or off at timing different from timing at which other series circuits are turned on or off. That is, there is not such a situation that the currents of all of the series circuits are turned on or off simultaneously.

This can prevent the loads from causing a sharp fluctuation in voltage, in view of the load driving circuit. Accordingly, it is possible to prevent external members and the like from generating sounds due to a sharp fluctuation in voltage. Further, with the arrangement, (i) there is no need to unnecessarily raise the frequency of the signal used in the PWM control in order to prevent the generation of sounds, (ii) a degree of freedom in selecting the frequency is improved, and also (iii) it is possible to prevent such a problem that, in a case of a high frequency, during the low duty period in the PWM control, the operation on the power source side of the series circuits cannot follow the switchover of the PWN control between the on state and off state.

Furthermore, in the load driving circuit of the present invention, (i) D flip-flops are preferably provided for respective series circuits in which currents are turned on or off at same timing, (ii) a PWM signal is preferably externally supplied to a first D flip-flop of the D flip-flops, (iii) a clock signal having a frequency which is N times (N is an integer more than 1) as high as that of the PWM signal is preferably supplied to each of the D flip-flops, (iv) an output signal of the first D flip-flop is preferably sequentially received by D flip-flops by which the first D flip-flop is followed, (v) and the switching circuits preferably control the currents of the respective series circuits to be turned on or off based on output signals of the D flip-flops provided for the respective series circuits.

Here, the D flip-flop includes two input terminals and one output terminal. The clock signal is supplied to one of the input terminals. When the clock signal changes from a low level to a high level, the input data supplied to the other input terminal is transmitted to the output. Other than the time, the D flip-flop plays a role of retaining the previous data output that has been outputted from the output terminal.

With the arrangement, the D flip-flops are provided for the respective series circuits in which the currents are turned on or off at same timing, and the currents of the series circuits are controlled to be turned on or off based on the output signals of the D flip-flops provided for respective series circuits. Further, the PWM signal is externally supplied to the first D flip-flop, and the clock signal is supplied to each of the D flip-flops. The output signal of the first D flip-flop is sequentially received by the D flip-flops by which the first D flip-flop is followed. In other words, the PWM signal is supplied to the first D flip-flop, and the next D flip-flop (second D flip-flop) receives the output signal of the first D flip-flop. After that, the signal is transmitted to the third D flip-flop, and then to the fourth D flip-flop . . . in the same manner. This makes it possible to sequentially switch over a current of each of the series circuits (each of which includes a plurality of loads connected in series) between the on (flowing) state and the off (not flowing) state. As a result, it is possible to reduce the load fluctuation generated in switching over the currents between the on state and the off state.

Moreover, in the load driving circuit of the present invention, (i) a PWM signal, and a clock signal having an arbitrary frequency which is N (N is an integer more than 1) times as high as that of the PWM signal are preferably externally supplied, (ii) said "N" is preferably higher than the number of the series circuits, and (iii) the switching circuits preferably causes timing, at which the currents of all the respective series circuits are turned on or off, to be different from each other.

With the arrangement, timing at which the currents of all the respective series circuits are turned on or off is caused to be different from each other, so that it is possible to minimize the load fluctuation generated in switching over the currents between the on state and the off state.

Further, in the load driving circuit of the present invention, (i) D flip-flops are preferably provided for the respective series circuits, (ii) the PWM signal is preferably supplied to a first D flip-flop of the D flip-flops, (iii) the clock signal is preferably supplied to each of the D flip-flops, (iv) an output signal of the first D flip-flop is preferably sequentially received by D flip-flops by which the first D flip-flop is followed, and (v) the switching circuits preferably control the currents of the respective series circuits to be turned on or off based on output signals of the D flip-flops provided for the respective series circuits.

Here, the D flip-flop includes two input terminals and one output terminal, and the clock signal is supplied to one of the input terminal. When the clock signal is changes from the low level to the high level, the input data supplied to the other input terminal is transmitted to the output. Other than the time, the D flip-flop plays a role of retaining the previous data output that has been outputted from the output terminal.

With the arrangement, D flip-flops are provided for the respective series circuits, and the currents of the respective series circuits are controlled to be turned on or off based on the output signals of the D flip-flops provided for the respective series circuits. Further, the PWM signal is supplied to the first D flip-flop, and the clock signal is supplied to each of the D flip-flops. The output signal of the first D flip-flop is sequentially received by D flip-flops by which the first D flip-flop is followed. In other words, the PWM signal is supplied to the first D flip-flop, and the next D flip-flop (second D flip-flop) receives the output signal of the first D flip-flop. After that, the signal is transmitted to the third D flip-flop, and then to the fourth D flip-flop . . . in the same manner. This makes it possible to sequentially switch over the current of each of the series circuits (each of which includes a plurality of loads) between the on (flowing) state and the off (not flowing) state. As a result, it is possible to reduce the load fluctuation generated in switching over the currents between the on state and the off state.

Furthermore, in the load driving circuit of the present invention, the clock signal preferably has the frequency N times as high as that of the PWM signal, and N is preferably the same as the number of the series circuits.

With the arrangement, it is possible to keep strength of the loads (that is, the number of the loads being in the on state) at a certain level all the time.

Moreover, in the load driving circuit of the present invention, the switching circuits are preferably provided to follow the respective D flip-flops.

Further, in the load driving circuit of the present invention, the plurality of loads are preferably light emitting diodes.

Furthermore, an integrated circuit of the present invention preferably includes: any one of the load driving circuits described above; and a constant current circuit for causing currents of the respective series circuits to be equal to each other.

Moreover, a DC-DC converter of the present invention preferably includes: any one of the load driving circuits described above; and a step-up circuit for stepping up a voltage received from an external power source to be a desired voltage so as to control the currents of the respective series circuits.

Further, an integrated circuit according to the present invention preferably includes any one of the load driving circuits described above.

Furthermore, a DC-DC converter according to the present invention preferably includes any one of the load driving circuits described above.

Moreover, a DC-DC converter according to the present invention preferably includes: the integrated circuit described above; and a step-up circuit for stepping up a voltage received from an external power source to be a desired voltage so as to control the currents of the respective series circuits.

Additional objects, features, and strengths of the present invention will be made clear by the description below. Further, the advantages of the present invention will be evident from the following explanation in reference to the drawings.

DESCRIPTION OF EMBODIMENTS

General Description

Figure 1:
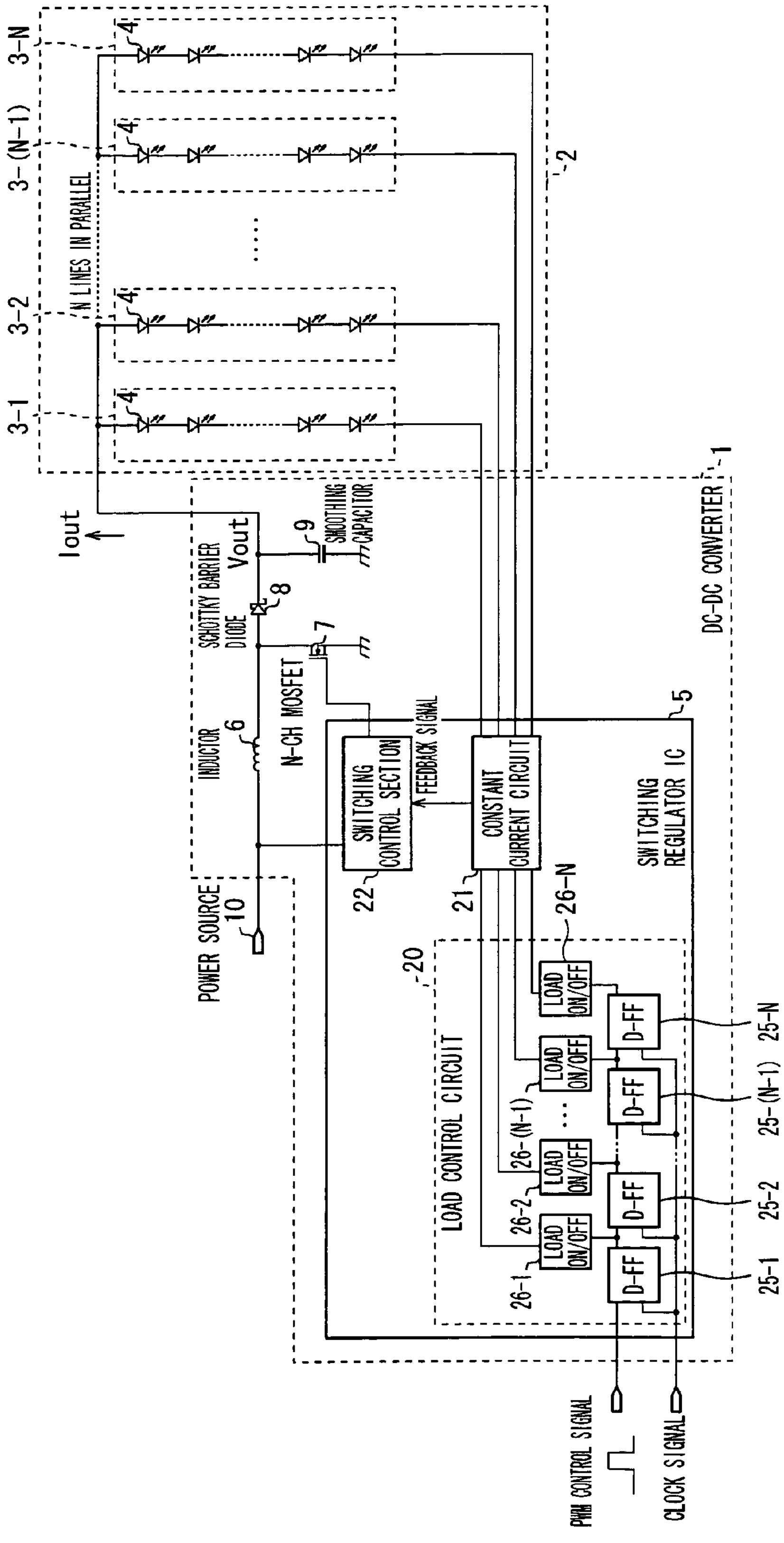
FIG. 1 is a diagram illustrating a DC-DC converter in accordance with one embodiment of the present invention, and a light emitting diode section.
Figure 2:
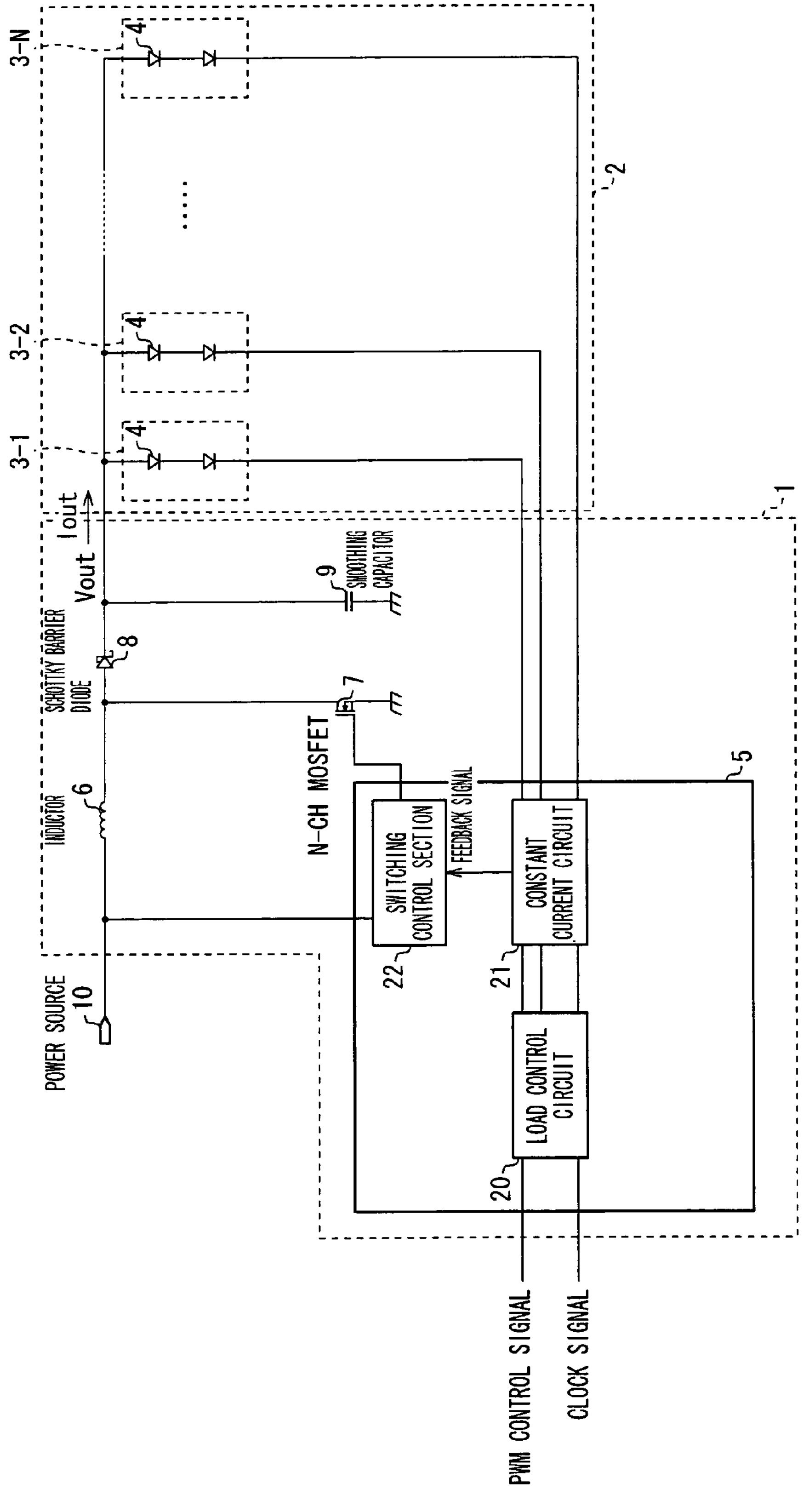
FIG. 2 is a diagram illustrating the DC-DC converter in accordance with the present embodiment, and the light emitting diode section.

FIG. 2 is a block diagram schematically illustrating a DC-DC converter in accordance with one embodiment of the present invention, and a light emitting diode section which is driven by the DC-DC converter, and FIG. 1 is a circuit diagram explaining FIG. 2 more specifically. One embodiment of the present invention is described below with reference to FIG. 1 and FIG. 2.

A DC-DC converter 1 drives a light emitting diode section 2. More specifically, the DC-DC converter 1 mainly supplies a constant current to the light emitting diode section 2, and simultaneously, as will be described later, plays a role of causing currents of light emitting diode lines 3-1 . . . 3-N to be equal to each other. For this reason, currents of the light emitting diode section 2 is fed back to the DC-DC converter 1, as illustrated in FIG. 1 and FIG. 2.

This light emitting diode section 2 is, as illustrated in FIG. 1 and FIG. 2, such a circuit that N light emitting diode lines (series circuits) 3-1 . . . 3-N, each of which includes a plurality of LEDs (light emitting diodes) 4 connected in series, are connected in parallel. It should be noted that "N" is not particularly limited as long as "N" is an integer more than 1. The light emitting diode 4 includes an anode terminal and a cathode terminal. If a predetermined forward voltage is applied from an anode side to a cathode side, a current is caused to flow in the light emitting diode 4. Along with this, the light emitting diode 4 emits light in a predetermined color.

Meanwhile, the DC-DC converter 1 includes, as illustrated in FIG. 1 and FIG. 2, a switching regulator IC 5, an inductor 6, an N-CH FET (N-CH MOSFET) 7, a schottky barrier diode 8, and a smoothing capacitor 9. Further, the inductor 6 and the switching regulator IC 5 are supplied with electric power from an external power source 10 provided outside the DC-DC converter 1. Furthermore, from outside the DC-DC converter 1, a PWM control signal (which corresponds to "PWM signal" in Claims) and a clock signal are supplied to the switching regulator IC 5. This clock signal has an arbitrary frequency equal to or more than N ("N" is an integer more than 1) times as high as the frequency of the PWM control signal, and further, the number "N" is the same as the number of the light emitting diode lines 3-1 . . . 3-N connected in Parallel.

[Step-up Circuit]

A step-up circuit includes the inductor 6, the N-CH FET 7, the schottky barrier diode 8, and the smoothing capacitor 9. The switching regulator IC 5 controls a cycle in which the N-CH FET 7 is turned on or off, so that the step-up circuit steps up a voltage supplied from the power source 10 to be a desired voltage. It should be noted that the step-up circuit of the present embodiment is used to adjust the brightness of the light emitting diode section 2. Therefore, the step-up circuit has a role of generating and controlling a desired current $I_{out}$ (a total current of currents of all of the light emitting diode lines 3-1 . . . 3-N).

The following further explains an arrangement of the step-up circuit. As illustrated in FIG. 1 and FIG. 2, an end of the inductor 6 is connected to the power source 10, and the other end of the inductor 6 is connected to a drain of the N-CH FET 7 and an anode of the schottky barrier diode 8. Moreover, a source of the N-CH FET 7 is grounded, and a PWM control signal received from the switching regulator IC 5 is supplied to a gate of the N-CH FET 7. Further, a cathode of the schottky barrier diode 8 and an end of the smoothing capacitor 9 are connected to each other, and the other end of the smoothing capacitor 9 is grounded.

The PWM control signal supplied from the switching regulator IC 5 to the gate of the N-CH FET 7 is different from another PWM control signal (described later) externally supplied to the DC-DC converter 1 to control each of the light emitting diodes 4 to be turned on or off.

This step-up circuit steps up a voltage applied from the power source 10 to the end of the inductor 6 by a predetermined value of voltage, and outputs an output voltage $V_{out}$ toward a connection point between the cathode of the schottky barrier diode 8 and the end of the smoothing capacitor 9, that is, toward a light emitting diode section 2 side. More specifically, the N-CH FET 7 is controlled to be turned on or off so that the inductor 6 and the smoothing capacitor 9 carry out an energy exchange. Thereby, the step-up circuit steps up the voltage, and then outputs the voltage.

In other words, a direct current (DC) voltage is applied to the inductor 6 from the power source 10. By controlling the N-CH FET 7 to be turned on or off; an alternating voltage is generated in the inductor 6. The alternating voltage is half-wave rectified in the schottky barrier diode 8, and then smoothed in the smoothing capacitor 9. Thus, it becomes possible to output a direct current (DC) voltage. As described above, a magnitude of the direct current voltage smoothed in the smoothing capacitor 9 and then outputted can be controlled by changing a cycle of a control signal that controls the N-CH FET 7 to be turned on or off. In such a step-up circuit, it is possible to generate the direct current voltage (output voltage) $V_{out}$ on the anode side of the light emitting diode 4.

It should be noted that in a case where there are a few light emitting diode lines 3, or in a case where the voltage of the external power source 10 is high, it is possible to drive the light emitting diode 4 without carrying out such step-up processing. In this case, the step-up circuit is not necessarily provided.

[Switching Regulator IC]

The switching regulator IC 5 includes, as illustrated in FIG. 1 and FIG. 2, a switching control section 22, a constant current circuit 21, and a load control circuit 20. For a predetermined output level (voltage or current), an output of the light emitting diode section 2 is fed back to the switching regulator IC 5, and the switching regulator IC 5 controls, based on the feedback, the cycle in which the N-CH FET 7 (ON/OFF cycle) is turned on or off. Thus, the switching regulator IC 5 keeps an output (output voltage $V_{out}$) at a certain level. It should be noted that, in the present embodiment, a current-driving load (the light emitting diode 4, for example) is controlled, so that a current is fed back from the light emitting diode section 2 to the switching regulator IC 5.

The switching control section 22 generates a PWM control signal based on a feedback signal received from the light emitting diode section 2 via the constant current circuit 21, and controls the N-CH FET 7 to be turned on or off based on the PWM control signal.

The constant current circuit 21 has a role of causing currents of the respective light emitting diode lines 3-1 . . . 3-N to be equal to each other. The constant current circuit 21 includes, not illustrated though, an error amplifier, a transistor, and a resistance, for example. That is, the constant current circuit 21 has a role of equally distributing the constant current $I_{out}$ generated by the DC-DC converter 1 to each of the light emitting diode lines 3-1 . . . 3-N. Because of this, the constant current circuit 21 causes the luminance of the light emitting diode lines 3-1 . . . 3-N connected in parallel to be uniform.

Note that the light emitting diodes 4 differ from each other in the forward voltage, so that it is necessary to provide a circuit to absorb the differences. The switching regulator IC 5 includes, not illustrated though, the circuit that absorbs the differences. As an IC having such a role of absorbing the differences or causing the luminance to be uniform, BU 6066 GU (manufactured by Roam) may be used, for example.

[Arrangement of Load Control Circuit]

Next, the following description deals with a load control circuit (which corresponds to "load driving circuit" in Claims), which is the most important part of the present invention.

Figure 3:
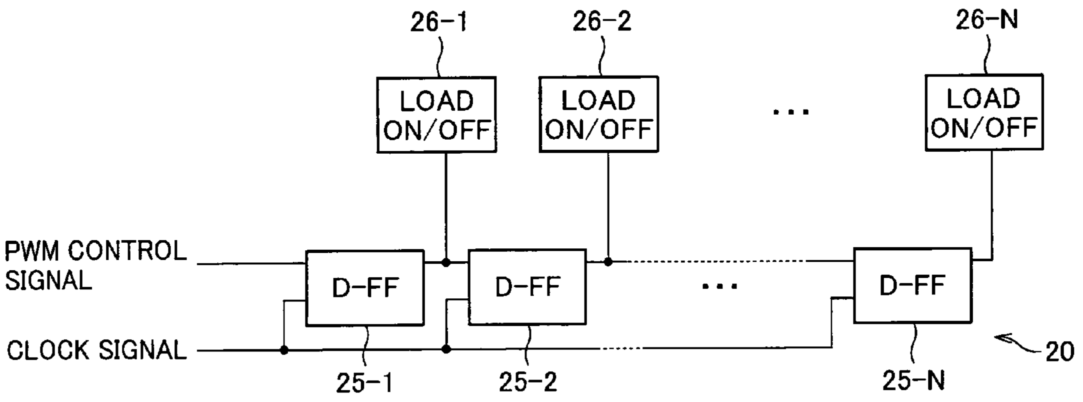
FIG. 3 is a diagram illustrating a circuit arrangement of a load control circuit of the present embodiment.

FIG. 3 is a block diagram illustrating an internal arrangement of the load control circuit 20. As illustrated in FIG. 3, the load control circuit 20 includes, D-FFs (D flip-flop) 25 corresponding to the respective light emitting diode lines 3-1 . . . 3-N, and switching circuits (load ON/OFF) 26 corresponding to the respective D-FFs 25. The switching circuits 26 are provided to follow the respective D-FFs 25. In FIG. 3, in accordance with the reference numerals of the light emitting diode lines "3-1 . . . 3-N", reference numerals of the D-FFs 25 are represented as "25-1, 25-2 . . . 25-N", and reference numerals of the switching circuits 26 are represented as "26-1, 26-2 . . . 26-N". Further, the D-FFs 25 are referred to as "a first D-FF (initial D-FF), a second D-FF . . . an Nth D-FF", and the switching circuits 26 are referred to as "a first switching circuit, a second switching circuit . . . an Nth switching circuit". Furthermore, for explanatory convenience, the reference numerals "25" and "26" are simply used in general explanations of the D-FFs and the switching circuits.

Figure 4:
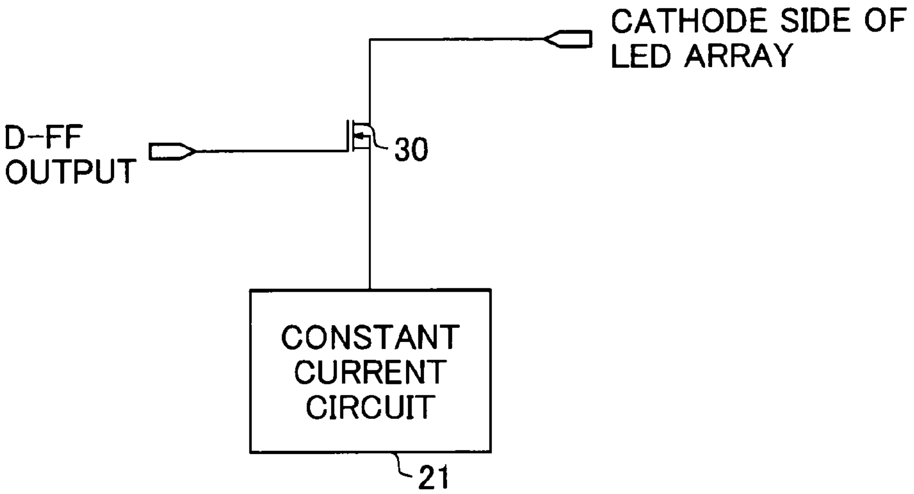
FIG. 4 is a diagram illustrating a connection relationship of a switching circuit of the load control circuit illustrated in FIG. 3.

The switching circuits 26 control, based on the logic of "H" or "L" outputted from the D-FFs 25, whether or not to apply currents to the corresponding light emitting diode lines 3-1 . . . 3-N. The switching circuit 26 is such an N-CH FET 30 that (i) a drain is connected to the cathode of the light emitting diode 4, (ii) a gate is connected to the D-FF 25, and (iii) a source is connected to the constant current circuit 21 (see FIG. 4).

As illustrated in FIG. 3, the D-FF 25 includes a data input terminal, a data output terminal, and another input terminal for a clock signal (CK) that controls a signal outputted from the data output terminal. In other words, the D-FF 25 includes three terminals. When the clock signal changes from a low level to a high level, input data supplied to the data input terminal is transmitted to the output. Other than the time, the D-FF 25 has a role of retaining a previous data output that has been outputted from the data output terminal.

As illustrated in FIG. 3, to all of the D-FFs 25, the same clock signal is supplied. Furthermore, a PWM control signal is supplied to a data input terminal of a first D-FF 25-1. An output signal of the first D-FF 25-1 is outputted to a data input terminal of a next (second) D-FF 25-2, and the switching circuit 26-1. After the second D-FF 25-2 receives the output signal of the first D-FF 25-1, an output signal of the second D-FF 25-2 is outputted to a data input terminal of a further next (third) D-FF 25-3, and the switching circuit 26-2. After that, the signal is transmitted in the same manner.

This causes the first switching circuit 26-1 to be turned on at timing one clock after the PWM control signal is switched over from the low level to the high level, and to be turned off at timing one clock after the PWM control signal is switched over from the high level to the low level. In other words, based on a signal waveform one clock after the signal waveform of the PWM control signal, the first switching circuit 26-1 is turned on or off repeatedly. Further, at timing one clock after the first switching circuit 26-1 is turned on or off, the second switching circuit 26-1 is turned on or off repeatedly. In the order of the first switching circuit 26-1, the second switching circuit 26-2, the third switching circuit 26-3 . . . , each of the switching circuits 26 is turned on (turned to be at the high level) one clock later sequentially. Then, after one cycle of the on state of the PWM control signal is retained, each of the switching circuits 26 is turned off (turned to be at the low level) one clock later sequentially. After that, the same operation is repeated.

By use of such a control signal having the same cycle as the PWM control signal, the currents of the light emitting diodes are controlled to be turned on or off at certain timing. Therefore, the luminance of the light emitting diode 4 is adjusted by use of a ratio of the on state to the off state.

Figure 5:
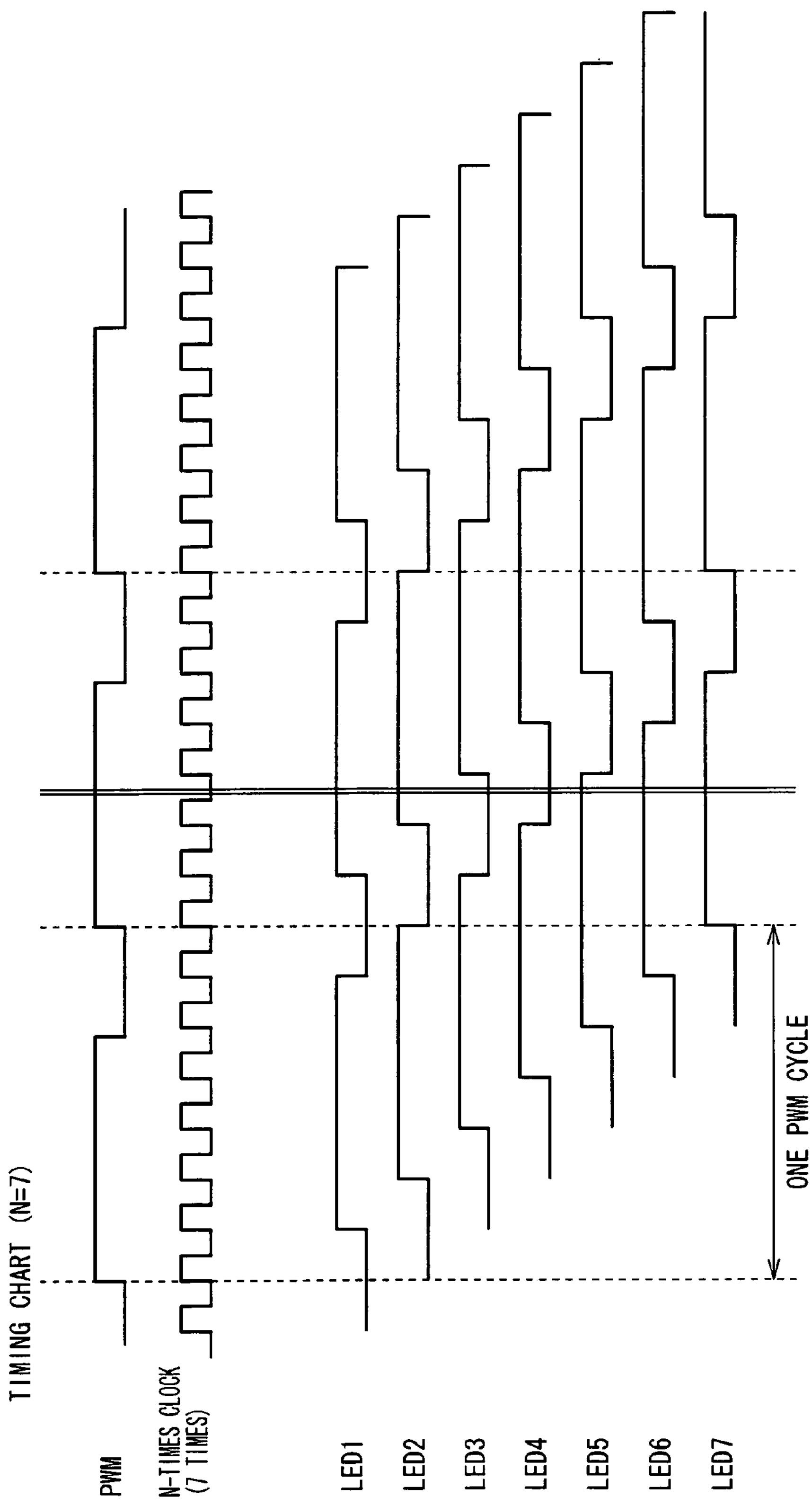
FIG. 5 is a timing chart showing, in a case where 7 light emitting diode lines are provided, (i) a waveform of a PWM control signal and (ii) waveforms of currents of light emitting diodes of the respective light emitting diode lines.

FIG. 5 is a timing chart showing, in a case where the number (N) of the light emitting diode lines 3-1 . . . 3-N is 7, for example, (i) a waveform of a PWM control signal, and (ii) a waveform of a current of the light emitting diode 4 provided in each of the light emitting diode lines 3-1 . . . 3-N. The light emitting diodes 4 provided in the respective light emitting diode lines 3-1 . . . 3-N are controlled in such a manner that the switching circuits 26 connected to the respective light emitting diode lines 3-1 . . . 3-N control the currents of the light emitting diodes 4 to be turned on (to flow) or off (not to flow). In FIG. 5, the waveforms of the currents of the light emitting diodes 4 provided in the respective light emitting diode lines 3-1 . . . 3-N, are referred to as "LED 1, LED 2 . . . LED 7".

As shown in the timing chart of FIG. 5, the PWM control signal, and the LED 1, the LED 2 . . . the LED 7 have the same frequency, and, as described above, in the above order, the D-FFs 25 cause each of the waveforms to rise one clock after a prior waveform rises This realizes the following effects. That is, with the arrangement described above, the light emitting diode lines 3-1 . . . 3-N are sequentially turned on or off. Therefore, unlike the conventional arrangement in which all of the light emitting diode lines 3-1 . . . 3-N are turned on or off simultaneously, the light emitting diode lines 3-1 . . . 3-N are sequentially turned on or off in a parallel direction. This can reduce a voltage fluctuation in the output voltage $V_{out}$ outputted from the DC-DC converter 1, so as to avoid problems such as the generation of sounds in the smoothing capacitor 9, for example. Moreover, this eliminates the limitation in selecting a frequency. Further, it is not necessary to set a frequency to be unnecessarily high in order to prevent the generation of sounds, so that it becomes possible to avoid such a problem that the operation of the DC-DC converter 1 cannot follow the switchover of the light emitting diode 4 between the on state and the off state.

Furthermore, in the present embodiment, as described above, the frequency of the clock signal is set to be equal to N times as high as the frequency of the PWM control signal, and also the "N" is set to be the same as the number of the light emitting diode lines 3-1 . . . 3-N (each of which includes the light emitting diodes 4).

Therefore, as shown in the timing chart of FIG. 5, a magnitude of the load (the number of lighted light emitting diodes 4) is retained at a certain level all the time, and simultaneously, the load cannot be disconnected (the number of lighted light emitting diodes 4 cannot become 0). For example, as shown in the timing chart of FIG. 5, among loads of 7 lines (7 light emitting diode lines 3-1 . . . 3-N), the loads of 5 lines (5 light emitting diode lines 3-1 . . . 3-N) are connected. Therefore, an average luminance becomes 5/7× 100%. Accordingly, it becomes possible to prevent peripheral members from generating sounds more effectively.

In a case where the duty ratio of the PWM control signal is 100%, the operation will be described below. (i) If the power source 10 is turned on, step-up operation is started. (ii) The constant current circuit 21 controls the current values of the LED lines (light emitting diode lines 3-1 . . . 3-N) to be equal to each other. (iii) The constant current circuit 21 transmits a signal to the switching control section 22 to control the N-CH FET 7 to be turned on or off so that the output voltage value of the switching regulator IC 5 is the same as a voltage value of an LED line that has the highest forward voltage among the LED lines. (iv) Because of this, excess voltages are applied to the light emitting diodes 4 of the LED lines except the light emitting diode 4 of the LED line that has the highest forward voltage. However, a transistor or the like is provided, for example, so that in a case where the cathodes of the LED lines are inputted into the constant current circuit 21 of the switching regulator IC 5, such excess voltages are absorbed by a corrector voltage or the like, for example. (v) The steps from (ii) to (iv) are repeated so that the operation becomes in a stable state.

In such a circuit arrangement, if the switching circuit 26 is provided on (or out of) a route from the output of the switching regulator IC 5 to the constant current circuit 21 via the light emitting diode 4, and the route is turned on or off, the current of the light emitting diode 4 can be turned on or off. This makes it possible to control the luminance of the light emitting diode 4. Further, it is possible to turn the current of the light emitting diode 4 on or off by, not disconnecting the route, but stopping the operation of the constant current circuit 21.

It should be noted that, in the foregoing descriptions, the frequency of the clock signal externally supplied to the switching regulator IC 5 is set to be the same as N times as high as the frequency of the PWM control signal externally supplied to the switching regulator IC 5, and simultaneously, the "N" is set to be the same as the number of the light emitting diode lines 3-1 . . . 3-N. However, the present invention is not limited to this, and the "N" may be set to be different from the number of the light emitting diode lines 3-1 . . . 3-N.

Figure 6:
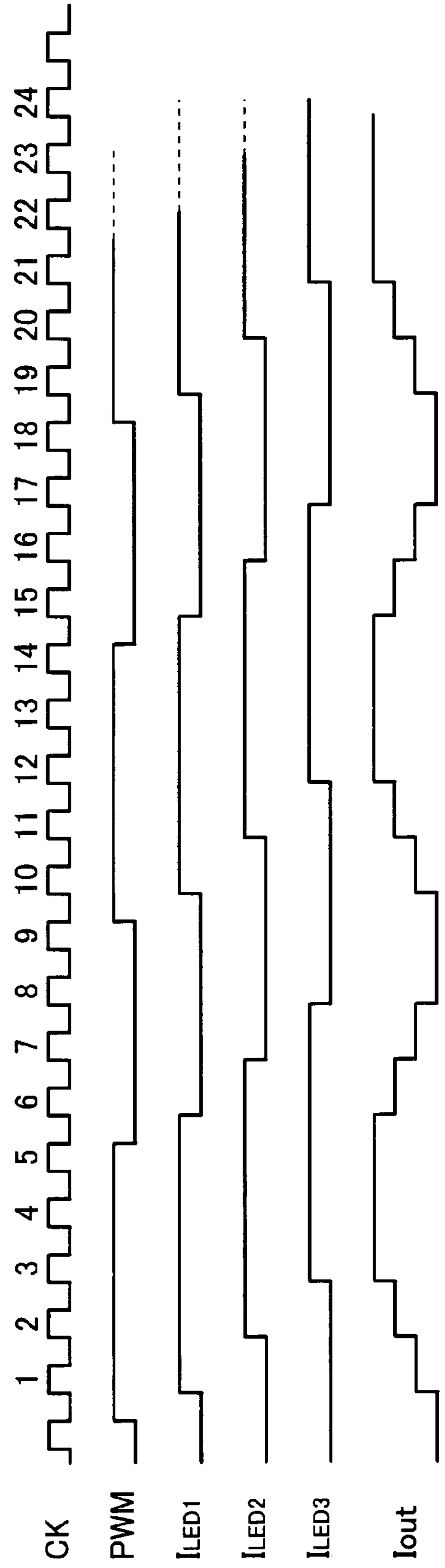
FIG. 6 is a timing chart corresponding to FIG. 5 in a case where "N" is bigger than the number of the light emitting diode lines 3.

FIG. 6 is a timing chart corresponding to FIG. 5 in a case where said "N" is bigger than the number of the light emitting diode lines 3-1 . . . 3-N. More specifically, as an example, the frequency of the clock signal is 5 times as high as the frequency of the PWM control signal, and the number of the light emitting diode lines 3-1 . . . 3-N is 3.

In this case, unlike the example described above, in view of a time axis, there is a time when all of the loads (light emitting diodes 4) are turned on or off, as shown in FIG. 5. Therefore, the loads are not at a certain level all the time. However, all of the loads are not turned on or off simultaneously, so that, as shown in FIG. 6, the load fluctuation, that is, a change in the Iout, does not occur sharply. For this reason, it is possible to reduce a fluctuation in the waveform of the $V_{out}$. Accordingly, the present invention can reduce the generation of sounds, as compared with the conventional technique.

Further, if the duty ratio of the PWM control signal is changed linearly, the ON/OFF control signal of the LED is transmitted through a shift resister circuit. Therefore, the luminance changes by only a "1/N" duty. Furthermore, if the frequency of the clock signal is higher than the frequency of the PWM control signal, it becomes possible to carry out the linear dimmer.

Moreover, with the arrangement described above, the load control circuit 20 is provided inside the switching regulator IC 5. However, the present invention is not limited to this, and the load control circuit 20 may be provided outside the switching regulator IC 5. In this case, the load control circuit 20 may be provided either on a cathode side of the light emitting diode 4, or on an anode side of the light emitting diode 4.

Moreover, with the arrangement described above, the clock signal having the frequency that is N times as high as the frequency of the PWM control signal is externally supplied to the load control circuit 20 separately from the PWM control signal. Usually, in order to switch over the N-CH FET 7 between the on state and the off state, a clock signal in a range from 500 kHz to 1 MHz is generated inside the switching regulator IC 5. Therefore, it is possible that the clock signal may not be inputted separately, but generated in such a manner that (i) a PLL circuit (not illustrated) is provided inside or outside the switching regulator IC 5, for example, and (ii) the clock signal generated in the switching regulator IC 5 is frequency-divided in the PLL circuit.

Further, the constant current circuit 21 may be any circuit as long as it is a circuit that can generate a constant current, such as a current mirror circuit.

It should be noted that the frequency of the PWM control signal for controlling the N-CH FET 7 to be turned on or off is in a range from 500 kHz to 1 MHz, and the frequency of the PWM control signal for controlling the switching circuit 26 to be turned on or off is in a range from 200 kHz to 300 kHz.

Furthermore, the order of controlling the currents of the light emitting diode lines to be turned on or off may be an order from an end light emitting diode line toward the other end light emitting diode line, or a random order. The order of controlling the currents to be turned on or off is not particularly limited. Moreover, it is possible to cause equal to or more than two of the light emitting diode lines 3-1 . . . 3-N to be turned on or off simultaneously.

Further, the D flip-flop 25 is not necessarily used, and it is possible to have another arrangement in which signals may be supplied directly from outside the switching regulator IC 5 to the switching circuit 26 connected to each of the light emitting diode lines 3-1 . . . 3-N in such a manner that each signal is supplied one clock after another signal, for example.

Furthermore, the load control circuit of the present embodiment can be applied to a multiple light LED driving circuit for a backlight of a liquid crystal display (LCD), for example. Moreover, in the above descriptions, the light emitting diode 4 is used as a load. However, the load is not particularly limited to the light emitting diode 4, and any load may be used as long as the load is used in such a manner that a plurality of loads are driven simultaneously at a constant voltage or a constant current.

Comparative Example

Figure 7:
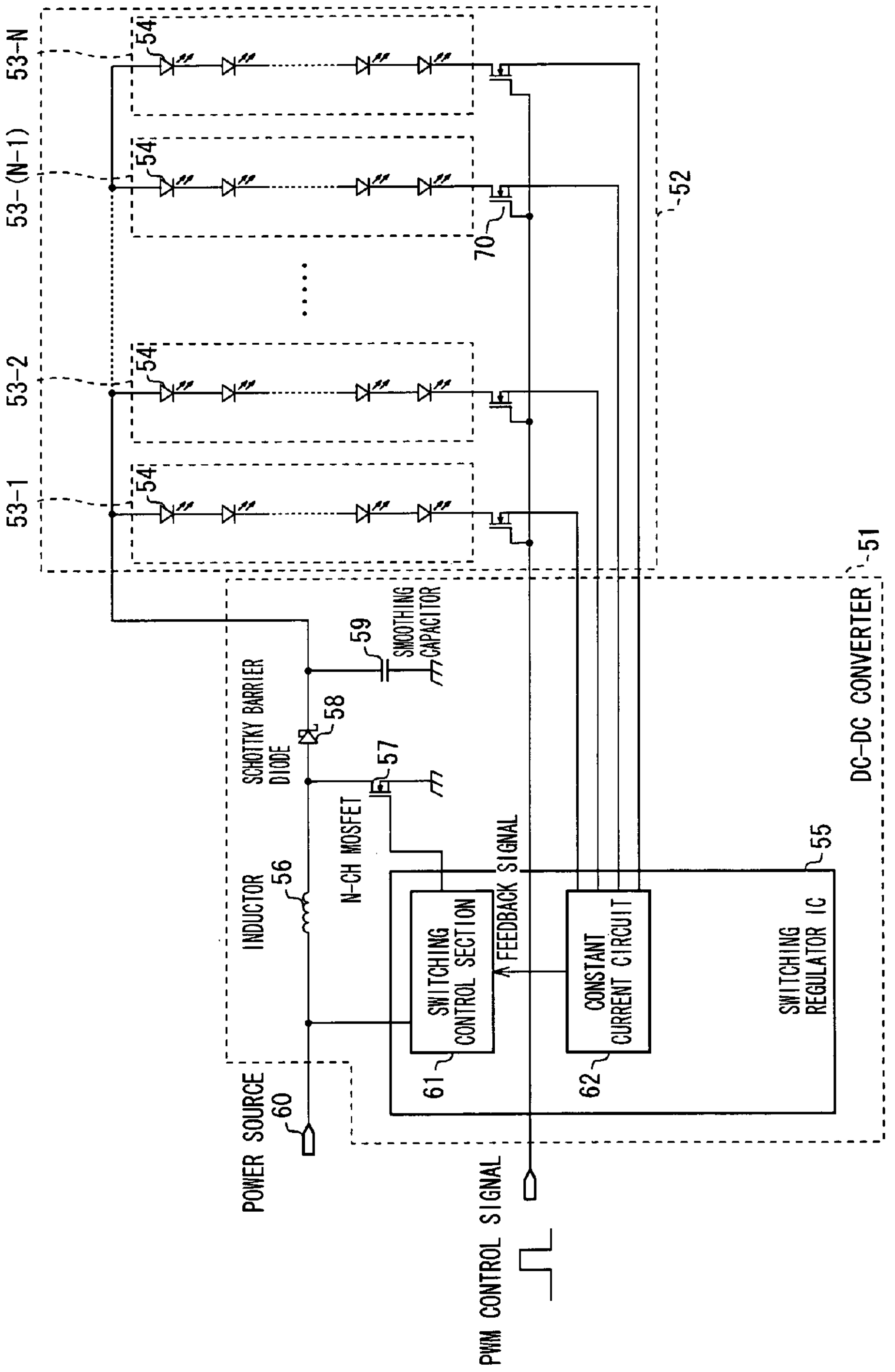
FIG. 7 is a diagram illustrating a DC-DC converter and a light emitting diode, as an example compared with the present embodiment.
Figure 8:
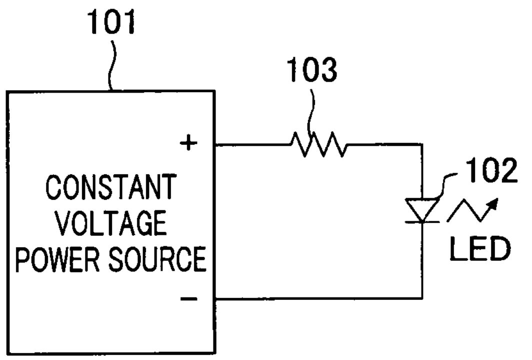
FIG. 8 is a diagram illustrating a conventional circuit for driving a light emitting diode.
Figure 9:
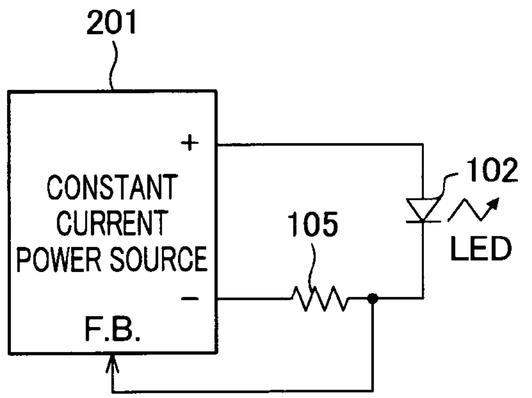
FIG. 9 is a diagram illustrating another conventional circuit for driving a light emitting diode.
Figure 10:
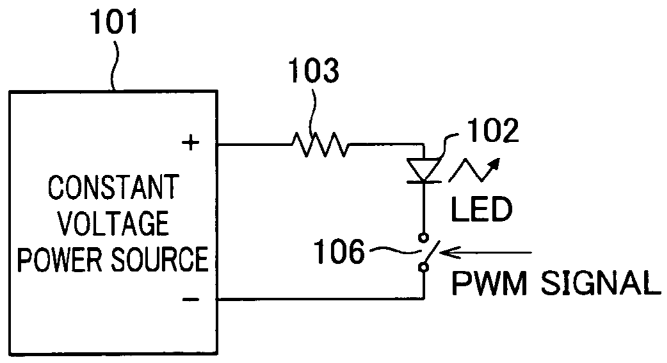
FIG. 10 is a diagram illustrating a still another conventional circuit for driving a light emitting diode.
Figure 11:
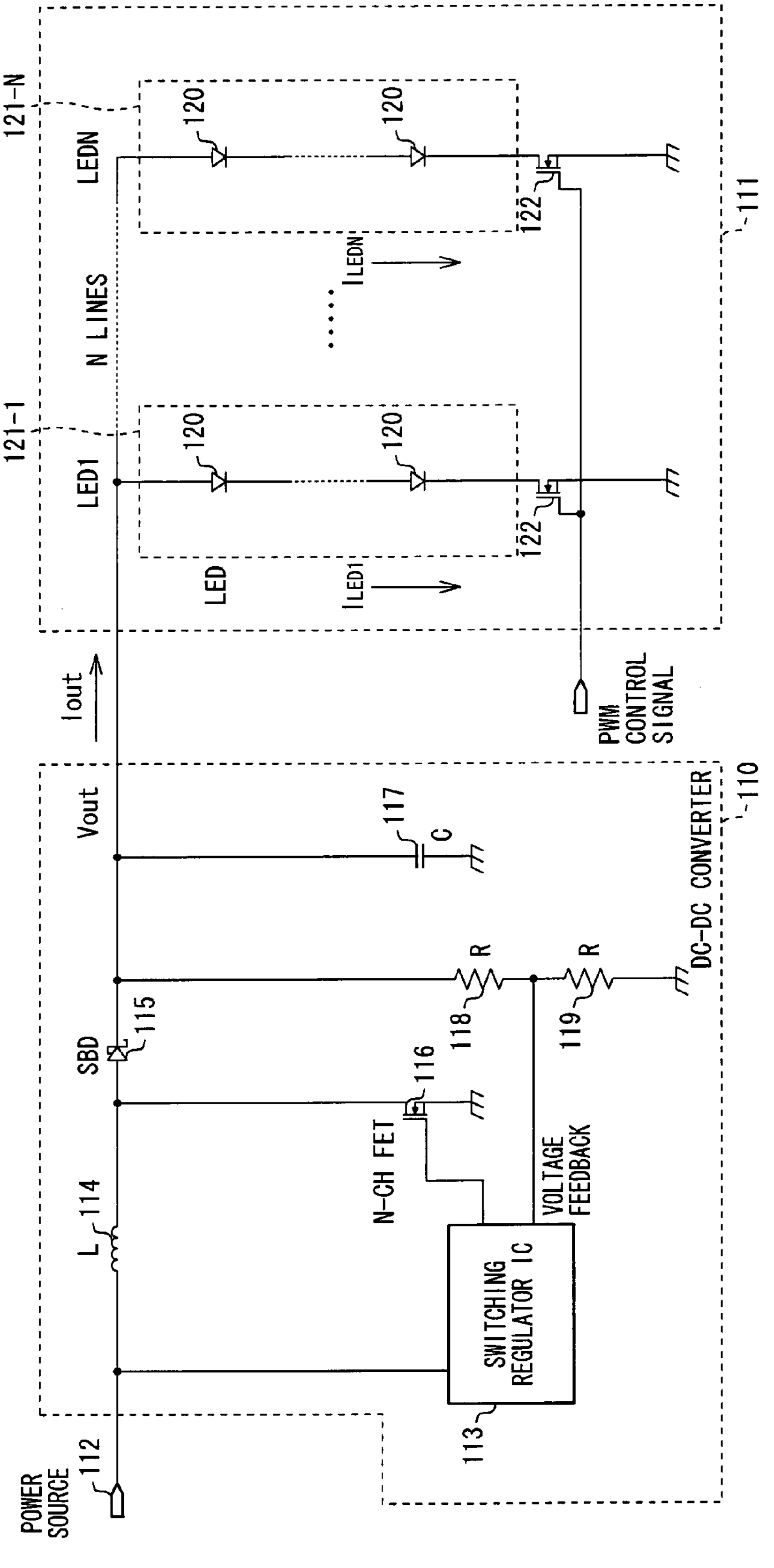
FIG. 11 is a diagram illustrating a conventional DC-DC converter and a light emitting diode section.
Figure 12:
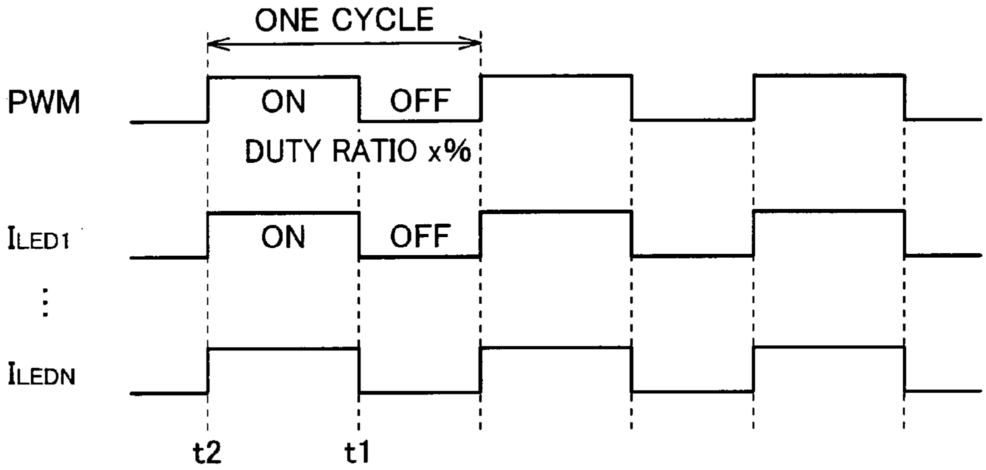
FIG. 12 is a timing chart of a conventional technique, showing a relationship between a PWM control signal supplied to a switching section illustrated in FIG. 11, and a current of each of the light emitting diode lines.
Figure 13:
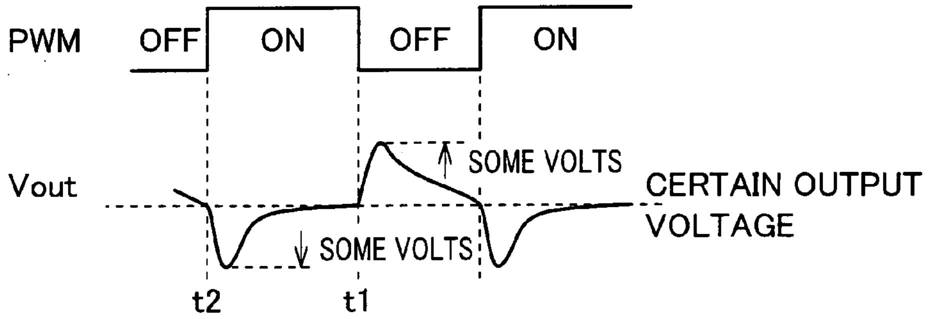
FIG. 13 is a timing chart of a conventional technique, showing a relationship between the PWM control signal supplied to the switching section illustrated in FIG. 11, and an output voltage applied by a DC-DC converter.
Figure 14:
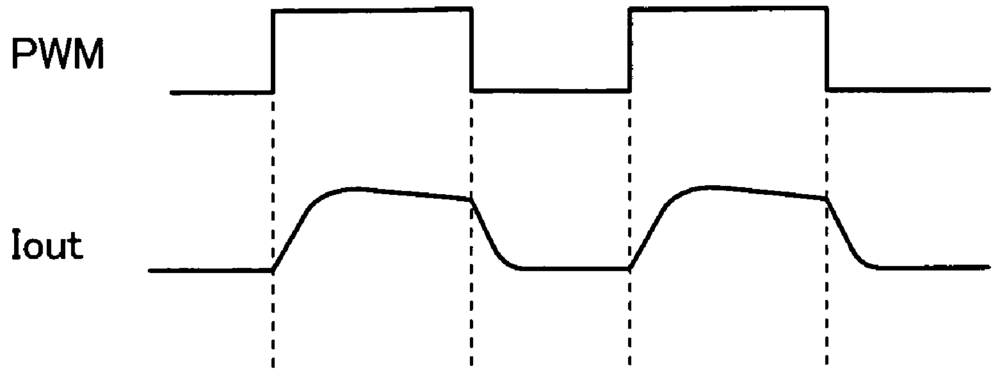
FIG. 14 is a timing chart of a conventional technique, showing a relationship between the PWM control signal supplied to the switching section illustrated in FIG. 11, and a current flowing between a DC-DC converter and a light emitting diode section.

FIG. 7 is a comparative example of the present embodiment described above. FIG. 7 is a view corresponding to FIG. 1.

In this comparative example, descriptions only deal with aspects that are different from the present embodiment, and explanations as to the aspects described in the above embodiment are omitted. It should be noted, however, that in order to clearly distinguish this example from the above embodiment, members that have the same functions as the members described in the above embodiment have different numerals or signs from those in the above embodiment.

As illustrated in FIG. 7, in this comparative example, the load control circuit of the present embodiment is not provided, and an N-CH FET 70 is provided on a cathode side of each of light emitting diode lines 53. To these N-CH FETs 70, the same PWM control signal is supplied. Therefore, all of the light emitting diodes 54 are turned on or off at the same time. Accordingly, there are problems, such as generation of sounds.

The present invention is not limited to the description of the embodiments above, but may be altered by a skilled person within the scope of the claims. An embodiment based on a proper combination of technical means disclosed in different embodiments is encompassed in the technical scope of the present invention.

As described above, in a load driving circuit according to the present invention for carrying out PWM control which causes currents of respective series circuits connected in parallel to be turned on or off, each of the series circuits including a plurality of loads connected in series, timing at which a current of any one of the series circuits is turned on or off is caused to be different from timing at which current(s) of at least another one of the series circuits is(are) turned on or off.

Further, a load driving method for carrying out PWM control which causes currents of respective series circuits connected in parallel to be turned on or off, each of the series circuits including a plurality of loads connected to each other in series, includes the step of causing timing at which a current of any one of the series circuits is turned on or off to be different from timing at which current(s) of at least another one of the series circuits is(are) turned on or off.

This makes it possible (i) not to have a reduction in a degree of freedom in selecting a frequency of a PWM control signal that is used to control loads, (ii) not to prevent peripheral circuit from following the PWM control signal, and (iii) to prevent generation of sounds.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A load driving circuit of the present invention is suitable for use as a backlight of a liquid crystal display device, for example.

REFERENCE SIGNS LIST

1. DC-DC CONVERTER
3-1. LIGHT EMITTING DIODE LINE (SERIES CIRCUIT)
3-2. LIGHT EMITTING DIODE LINE (SERIES CIRCUIT)
3-(N−1). LIGHT EMITTING DIODE LINE (SERIES CIRCUIT)
3-N. LIGHT EMITTING DIODE LINE (SERIES CIRCUIT)
4. LIGHT EMITTING DIODE (LOAD)
5. SWITCHING REGULATOR IC (INTEGRATED CIRCUIT)
10. POWER SOURCE (EXTERNAL POWER SOURCE)
20. LOAD CONTROL CIRCUIT (LOAD DRIVING CIRCUIT)
21. CONSTANT CURRENT CIRCUIT
25-1. FIRST D-FF (D FLIP-FLOP)
25-2. SECOND D-FF (D FLIP-FLOP)
25-(N−1). (N−1)TH D-FF (D FLIP-FLOP)
25-N. NTH D-FF (D FLIP-FLOP)
26-1. FIRST SWITCHING CIRCUIT (SWITCHING CIRCUIT)
26-2. SECOND SWITCHING CIRCUIT (SWITCHING CIRCUIT)
26-(N−1). (N−1)TH SWITCHING CIRCUIT (SWITCHING CIRCUIT)
26-N. NTH SWITCHING CIRCUIT (SWITCHING CIRCUIT)

The invention claimed is:

1. A load driving circuit, comprising, switching circuits configured to carry out pulse-width modulation (PWM) control by turning currents of respective series circuits connected in parallel on or off, each of the series circuits including a plurality of loads connected in series, the switching circuits configured to turn a current of any one of the series circuits on or off according to a first timing and to turn a current of at least a different one of the series circuits on or off according to a second timing, the first timing being different from the second timing, the first and second timings based on a PWM signal and a clock signal, wherein a frequency of each of the first and second timings and the PWM signal is a same frequency.

2. A load driving circuit, comprising:

switching circuits configured to carry out pulse-width modulation (PWM) control by turning currents of respective series circuits connected in parallel on or off, each of the series circuits including a plurality of loads connected in series, the switching circuits configured to turn a current of any one of the series circuits on or off according to a first timing and to turn a current of at least a different one of the series circuits on or off according to a second timing, the first timing being different from the second timing; and D flip-flops corresponding to respective series circuits in which currents are turned on or off at same timing, wherein a first D flip-flop of the D flip-flops is configured to receive a PWM signal, each of the D flip-flops are configured to receive a clock signal with a frequency N times greater than a frequency of the PWM signal, N being an integer greater than 1;

D flip-flops of the D flip-flops following the first D flip-flop are configured to sequentially receive an output signal of the first D flip-flop;

the switching circuits are configured to control the currents of the respective series circuits to be turned on or off based on output signals of the D flip-flops corresponding to the respective series circuits.

3. A load driving circuit, comprising:

switching circuits configured to carry out pulse-width modulation (PWM) control by turning currents of respective series circuits connected in parallel on or off, each of the series circuits including a plurality of loads connected in series, wherein the load driving circuit is configured to receive a PWM signal, and a clock signal with an arbitrary frequency times greater than a frequency of the PWM signal, N being an integer, the "N" is greater than a number of the series circuits, and the switching circuits are configured to turn the currents of all the respective series circuits on or off according to different timings.

4. The load driving circuit according to claim 3, further comprising:

D flip-flops corresponding to the respective series circuits, wherein a first D flip-flop of the D flip-flops is configured to receive the PWM signal, each of the D flip-flops is configured to receive the clock signal, D flip-flops of the D flip-flops following the first D flip-flop are configured to sequentially receive an output signal of the first D flip-flop, and the switching circuits are configured to control the currents of the respective series circuits to be turned on or off based on output signals of the D flip-flops corresponding to the respective series circuits.

5. The load driving circuit according to claim 1, wherein:

a frequency of the clock signal is N times greater than a frequency of the PWM signal; and N is same as a number of the series circuits.

6. The load driving circuit according to claim 2, wherein:

the switching circuits follow the respective D flip-flops.

7. The load driving circuit according to claim 4, wherein:

the switching circuits follow the respective D flip-flops.

8. The load driving circuit according to claim 5, wherein:

the switching circuits the respective D flip-flops.

9. The load driving circuit according to claim 1, wherein:

the plurality of loads are light emitting diodes.

10. An integrated circuit comprising:

a load driving circuit recited in claim 1; and a constant current circuit configured to equalize currents of the respective series circuits.

11. A DC-DC converter comprising:

a load driving circuit recited in claim 1; and a step-up circuit configured to step up a voltage received from an external power source to a target voltage to control the currents of the respective series circuits.

12. A DC-DC converter, comprising:

an integrated circuit recited in claim 10; and a step-up circuit configured to step up a voltage received from an external power source to a target voltage to control the currents of the respective series circuits.

13. A DC-DC converter comprising a load driving circuit recited in claim 1.

14. A DC-DC converter comprising an integrated circuit recited in claim 10.

15. A load driving method to carry out pulse-width modulation (PWM) control, the method comprising the step of:

turning currents, of respective series circuits connected in parallel and each including a plurality of loads connected in series, on or off according to timings based on a PWM signal and a clock signal such that a timing at which a current of any one of the series circuits is turned on or off is different from timing at which a current of at least a different one of the series circuits is turned on or off, wherein a frequency of each of the first and second timings and the PWM signal is a same frequency.

16. The method of claim 15, wherein a frequency of the clock signal is a frequency N times greater than a frequency of the PWM signal, N being an integer greater than a number of the series circuits; and the turning the currents of respective series circuits on or off includes turning the currents of all the respective series circuits on or off according to different timings.

17. The method of claim 15, wherein the turning currents of respective series circuits on or off includes turning the current of each of the series circuits on or off for a same length of time.

18. The method of claim 17, wherein the turning currents of respective series circuits on or off includes sequentially turning the currents one of on and off at an interval of one cycle of the clock signal.

19. A load driving circuit, comprising;

a plurality of switching circuits connected in parallel and each including a plurality of loads connected in series, the switching circuits configured to carry out pulse-width modulation (PWM) control by turning a current of a first one of the series circuits one of on and off according to a first timing based on a PWM signal and a clock signal, and by turning a current of a second one of the series circuits the one of the on and off according to a second liming based on the PWM signal and the clock signal, the first timing being different from the second timing, a duty ratio of the first one of the series circuits being the same as a duty ratio of the second one of the series circuits.

20. The load driving circuit of claim 19, wherein a duty ratio of the PWM signal is same as the duty ratio of the first and second series circuits.

* * * * *